March 12, 1968  K. W. KLEIN  3,373,276
TERMINAL PEDESTAL FOR UNDERGROUND WIRING SYSTEMS
Filed July 26, 1965  4 Sheets-Sheet 1
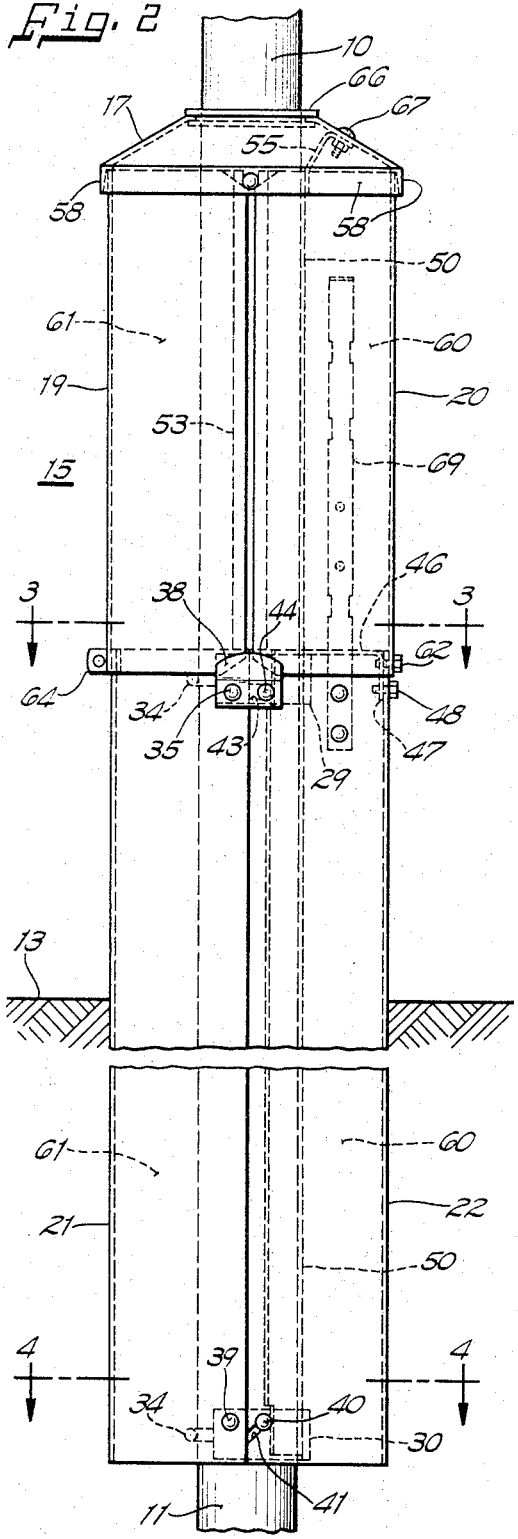
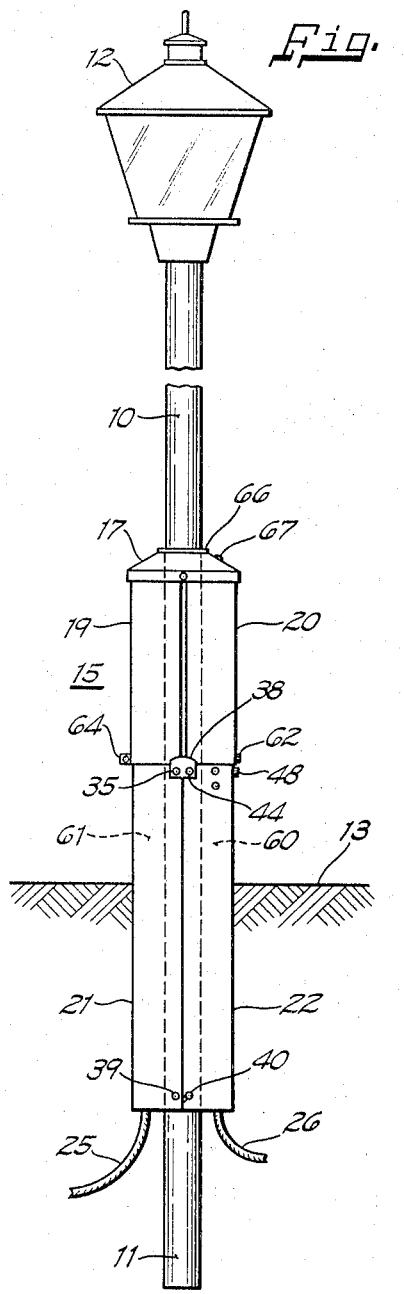
INVENTOR.
Kenneth W. Klein
BY
Robert W. Laktinen
Attorney

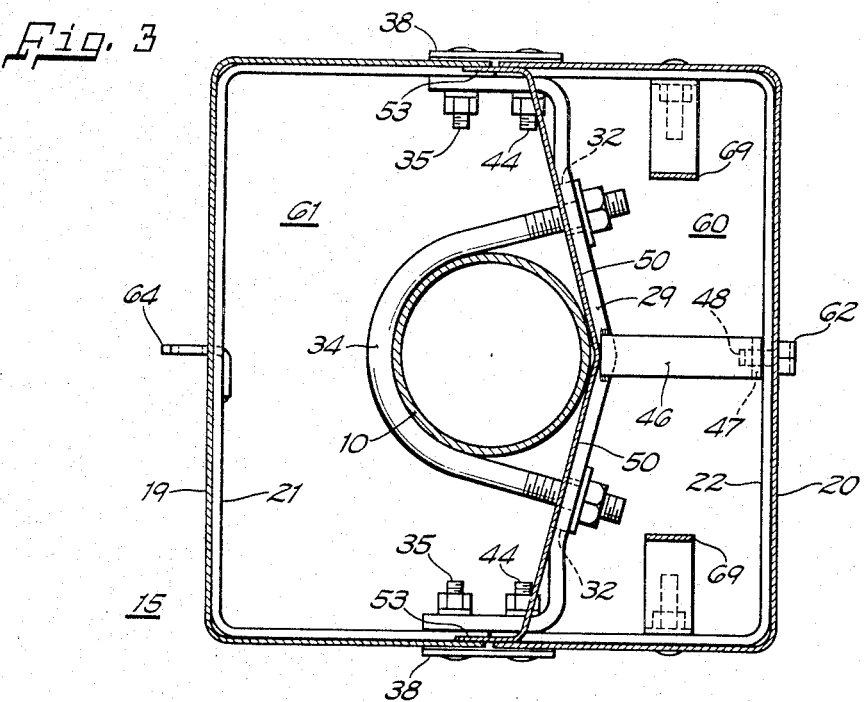
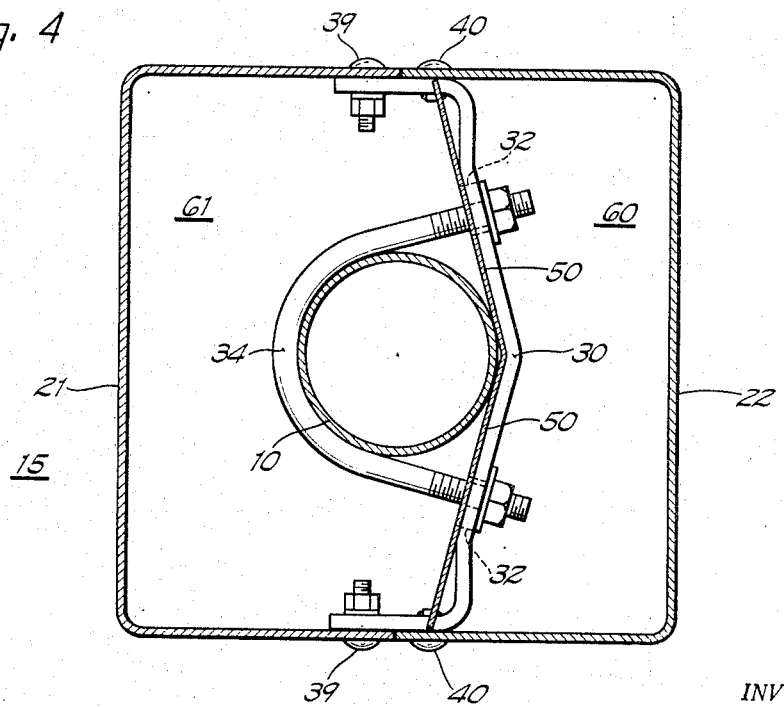

March 12, 1968  K. W. KLEIN  3,373,276
TERMINAL PEDESTAL FOR UNDERGROUND WIRING SYSTEMS
Filed July 26, 1965  4 Sheets-Sheet 3
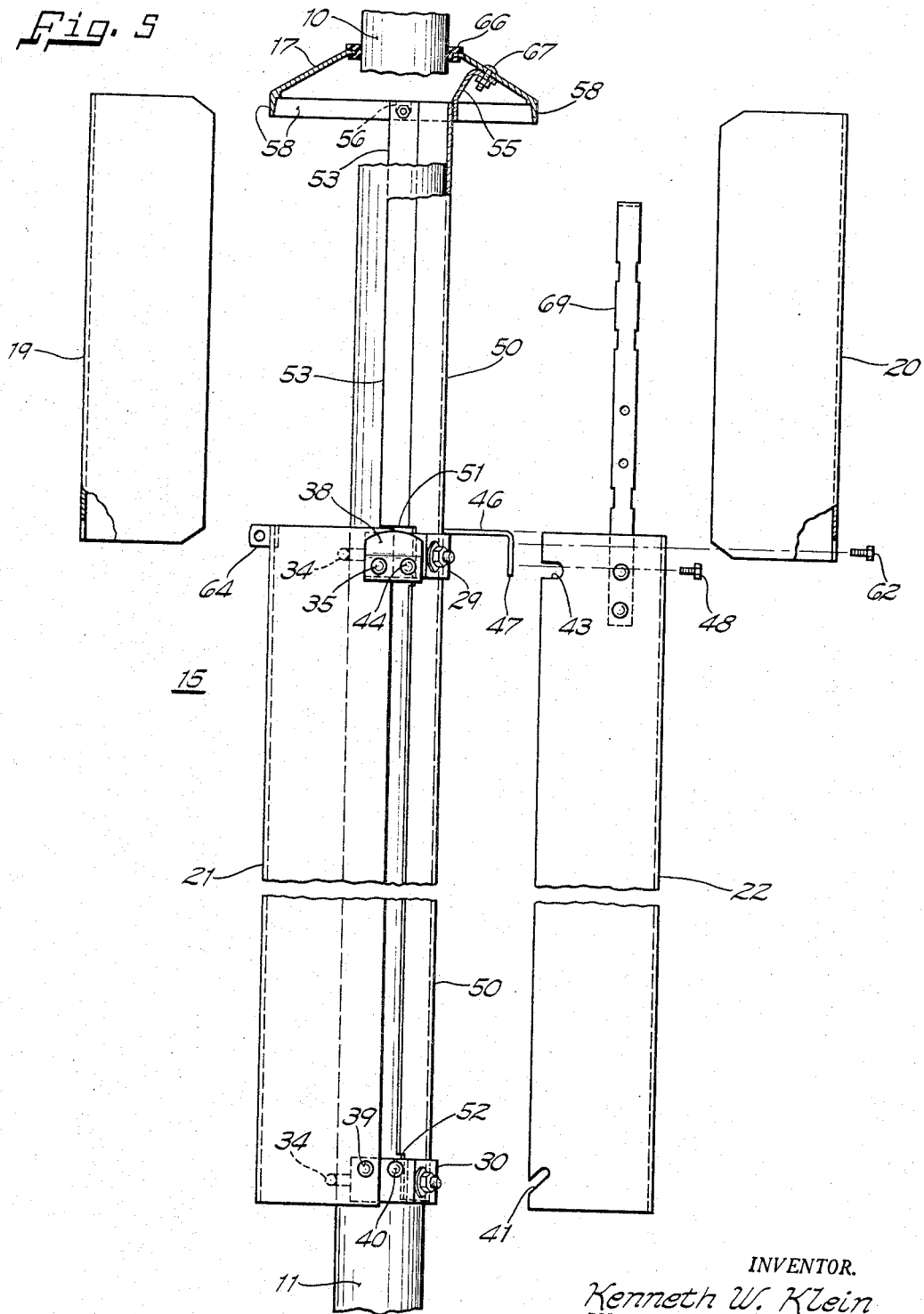
INVENTOR.
Kenneth W. Klein
BY
Robert W. Lattiern
Attorney

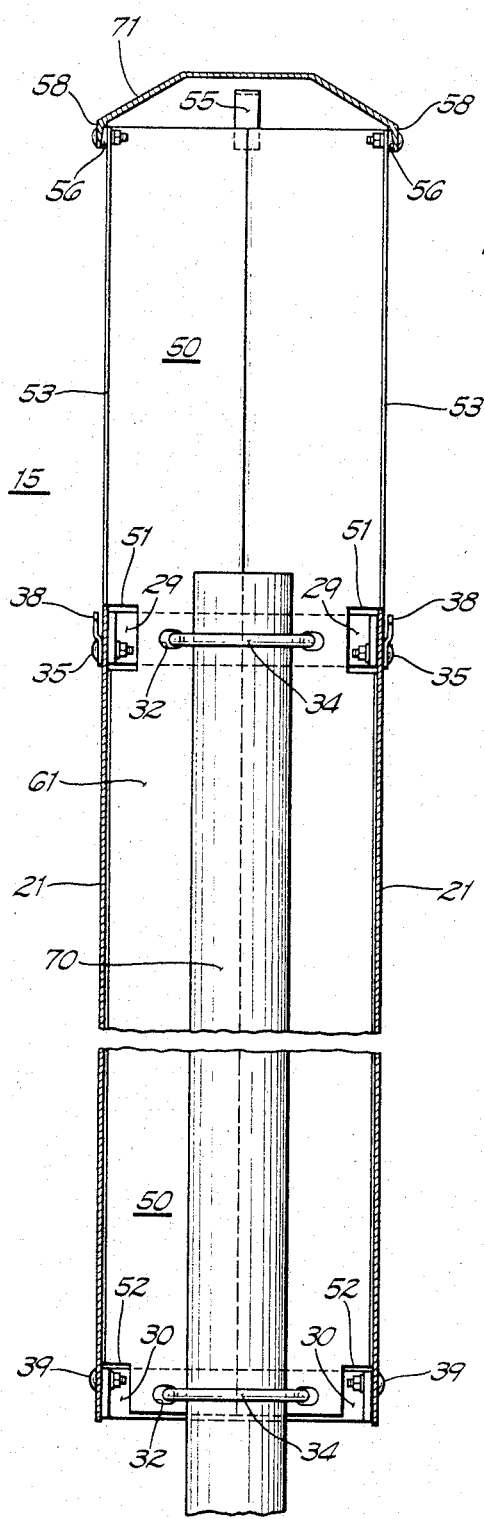

United States Patent Office 3,373,276
Patented Mar. 12, 1968

3,373,276
TERMINAL PEDESTAL FOR UNDERGROUND
WIRING SYSTEMS
Kenneth W. Klein, 28517 Wolf Road,
Bay Village, Ohio 44140
Filed July 26, 1965, Ser. No. 474,581
2 Claims. (Cl. 240—84)

ABSTRACT OF THE DISCLOSURE

The combination of, a support pole having a luminaire at its upper end and an underground wiring system enclosure secured to the pole. The enclosure comprises a pair of generally U-shaped ground line cover members secured to the pole to form a hollow open-ended enclosure extending above and below a ground level, a pair of generally U-shaped access members surrounding the pole and extending upwardly from the top of the ground line cover members and cooperating therewith to form an uninterrupted vertically extending enclosure housing above and below ground level and a partition extending between the cooperating edges of the access members to divide the same into two vertical compartments. An apertured cover surrounds the pole for closing the upper end of the enclosure. The access members are selectively removably mounted on the ground line cover members and the cap for individually exposing each compartment.

Background of the invention

This invention relates to a terminal connecting pedestal for buried wiring systems and, more particularly, to a dual purpose pedestal providing an above ground assembly for connecting and splicing conductors of two services as, for example, power transmission and telephone cables.

Improved materials that extend the life of conductor insulations and the development of better methods of burying conductors have given rise to extended use of underground systems which, although more costly, have definite advantages in maintenance, safety, resistance to storm damage and improved appearance.

In areas where it is elected to use underground systems, material savings can be realized in cost of burying conductors and providing termination facilities if common trenches and termination equipment can be utilized. Further, since a principal feature of the underground system is the elimination of visible equipment, it is desirable not to replace poles and overhead wires with a maze of ground level equipment enclosures and termination housings that must be camouflaged or otherwise rendered more aesthetically acceptable.

To minimize the number of termination accommodating pedestal units required, it is increasingly becoming the practice of telephone and power utilities to utilize common enclosures. In reaching an accord for common use, it is necessary that the requirements of both utilities be satisfied which necessitates separate compartments within the enclosure. One reason for this is that the power company will want to deny access of the power compartment to others by locking the enclosure whereas telephone utility policy is usually to securely fasten the enclosure access cover, but not provide a lock.

The applicant, in the present invention, has provided a joint use pedestal for serving the termination requirements of two utilities while commonly disposing the pedestal as the base portion of a lighting pole. The pedestal is disposed about and uses a pole member as a support stake embedded in the ground. The enclosure, having underground portions rigidly connected to the pole which engage the ground further from the pole axis than the pole itself, serves to stabilize and further support the pole in addition to receiving support from the pole.

Although the pole may be used solely as a stake member for the pedestal, the common practice is to utilize the pole which supports the street lighting luminaire. In this way, only infrequently are additional free-standing pieces of equipment required for making the above ground connections.

Since the entire system is composed of a luminaire supporting pole, a luminaire supporting pole with a pedestal enclosure about the base or a pedestal using a shortened pole as the stake, a minimum number of different parts form the system. This is particularly true since the combined pedestal and pole requires no operations on the pole and, accordingly, the luminaire supporting pole is the same whether used alone or with the pedestal enclosure.

It is an object of this invention to provide an improved joint use pedestal for underground services.

It is a further object of this invention to combine a joint use pedetal with a lighting pole to minimize the required number of pieces of above ground equipment in an underground distribution system and realize benefits of mutual support between the pole and the pedestal.

It is also an object of this invention to provide a joint use dual compartment pedestal about the base of the pole such that the pedestal and pole mutually provide support for one another to enhance the stability in the composite structure.

Brief description of the drawings

FIG. 1 is an elevation partially broken away of the combination illuminating pole and terminal pedestal of this invention;

FIG. 2 is an enlarged elevation view of the pedestal portion of FIG. 1 partly broken away with interior portions shown in phantom view;

FIG. 3 is a section view taken along line 3—3 of FIG. 2;

FIG. 4 is a section view taken along line 4—4 of FIG. 2;

FIG. 5 is an exploded view partially broken away and partially in section of the pedestal of FIG. 2; and FIG. 6 is a vertical section with portions removed of a pedestal of an alternative embodiment of this invention where a pole is used solely as a supporting stake for the pedestal.

Description of the preferred embodiment

Referring to the drawings FIG. 1 shows a pole 10 having a lower portion 11 embedded in the ground and a luminaire 12 supported about the upper end. Surrounding the base of the pole at the ground line 13 is a pedestal housing 15 with an apertured cap 17 through which the pole 10 extends. A pair of removable access covers 19, 20 and a pair of ground line covers 21, 22 with the lower portions embedded in the ground and the upper ends extending to the access covers, cooperate with pole 10 and cap 17 to provide an uninterrupted enclosure above ground line 13. The lower end of the pedestal enclosure below the ground line is open to permit the entry of utility cables or conductors 25, 26 from a random lay underground cable system.

With reference to FIGS. 2 through 5, the pedestal 15 includes upper and lower generally U-shaped bracket members 29 and 30 respectively. Each of the brackets 29, 30 has a pair of elongated spaced apertures 32 adapted to receive the diverging legs of a U-bolt 34. Ground line covers 21 and 22 are secured to the legs of the brackets 29 and 30. The upper end of ground line cover 21 is secured to bracket 29 by a pair of bolts 35 which each also pass through and retain a locking clip 38. At the lower end, cover 21 is secured to the bracket 30 by bolts 39. The ground line cover 22 is retained at the bottom by a pair of rivets 40 which are secured to bracket 30 and receive the downwardly inclined open-ended slot 41 about the shank portion thereof. With the lower slot engaging the rivet 40, the top portion is pivoted to a vertical position wherein the upper slots 43 are received about bolts 44. An L-shaped bracket 46 has one leg welded to the upper bracket 29 and a vertical portion 47 which receives a bolt 48 that extends through the wall of cover 22 into a threaded aperture to retain the cover in the assembled position as shown in FIG. 2. The bolts 44 are thereupon tightened to securely position the cover 22 in the assembled condition.

A vertically extending central barrier wall 50 extends vertically within the pedestal enclosure from the cap 17 to substantially the bottom of the pedestal to divide the enclosure into two vertically extending compartments. The partition or barrier 50 throughout the height that it is coextensive with the ground line covers 21, 22 has marginal edges that are in substantially abutting relation with the interior surfaces of the flange portion of ground line cover 22 (FIG. 4), except for two relieved portions 51, 52 along each edge to avoid interference with the legs of brackets 29 and 30. From the top of the ground line covers 21, 22 to the cap 17, the barrier 50 is provided with marginal flanges 53 at each side which have the outer surfaces of each aligned with the outer surfaces of the adjoining ground line cover. Also forming a part of the barrier structure is a bracket support strap 55 welded to an upper portion. The cap 17 is bolted to the barrier flanges 53 at either side through bosses 56 which space the flanges and the downwardly depending peripheral wall portion 58 of cap 17 to permit subsequent assembly of the access covers 19 and 20 between the barrier flange 53 and the cap peripheral wall 58. Bolting the barrier support strap 55 to the cap 17 positively aligns the cap and barrier wall 50.

The barrier wall 50 is provided with upper and lower pairs of elongated apertures through which the diverging legs of U-bolts 34 are received and extend in the assembled condition to retain the barrier wall captive between the brackets 29 and 30 and the pole 10.

The access covers 19 and 20 are of generally U-shaped construction and each is received over the barrier flanges 53 and upper exterior marginal surfaces of the adjacent ground line cover 21 and 22 respectively in closely telescoped relation. The upper marginal edge of each of the access covers 19 and 20 is telescoped under the peripheral wall portion 58 of the cap 17 and a lower portion is retained at each side between the locking clip 38 and the adjacent ground line cover.

The vertically extending terminal compartment 60 is provided in the example of the illustrated embodiment for telephone terminals and the access cover 22 is accordingly retained by a bolt 62. Terminal compartment 61, as illustrated, is provided for power terminals and, accordingly, a padlock bail 64 is welded to the interior surface of the cover 21 and passes through a slotted opening in the cover to be received in a slot in the lower margin of the access cover 19 enabling the cover to be locked in position for safety.

The pole 10 passes through a rubber grommet 66 to afford a seal between the pole and the wall defining the cap aperture. Suitable sealing means are also provided with respect to bolt 67 to assure the moisture tight integrity of the cap portion overlying the telephone terminal compartment 60.

It will be noted that the confronting vertical marginal edges of the ground line covers 21 and 22 are in closely abutting relation. The access covers 19 and 20 have a small but definite clearance between the confronting flange wall edges to make them readily assemblable and removable. There are no junctions between the enclosure part in the area of the access covers which are achieved by the abutting relation of adjoining parts. Each juncture is effected by telescoping one wall portion closely over another since this affords extra safety in the region where conductor termination might present uninsulated portions which could create a hazard. As an example of a terminal mounting support, bracket 69 is shown in the telephone compartment secured to ground line cover 22.

Installation of the combined joint pedestal and pole is effected by securing the U-bolts 34 through the brackets 29, 30 and barrier 50 about the pole 10 at the ground line cover 21 secured to the brackets 29 and 30 and the cap 17 in position. The pole and pedestal thus partially assembled are then partially imbedded in the ground and the electrical cables brought into the compartment 61. The telephone cables are thereafter brought into the telephone compartment, the ground line cover 22 installed and the burial of the lower portion of the pedestal completed.

The pole 10 extends substantially further below the ground line 13 than does the lowermost pedestal portion to provide the supporting stake structure while the peripheral walls of the pedestal are disposed a substantially greater distance from the vertical axis of the combined unit than the pole wall portion to afford a stabilizing structure.

FIG. 6 shows an alternative embodiment of the invention with the access covers removed and the cap and ground line cover in section. In this embodiment, a shortened pole 70 is used which serves only as a stake member to provide support for the pedestal assembly, terminating jut above the upper bracket 29. The cap 71 is also modified to eliminate the aperture of cap 17 as shown in FIGS. 1 through 5.

Although specific embodiments have been shown and described, it will be apparent to those skilled in the art that various changes and modifications may be made therein without departing from the spirit of the invention or from the scope of the appended claims.

What is claimed is:

1. In combination with a pole having the lower end thereof extending below ground level, a conductor terminal enclosure comprising a hollow, open-ended, generally tubular ground cover surrounding said pole and extending vertically above and below ground level, a pair of generally channel-shaped access covers surrounding said pole and extending from the upper end of the ground line cover, the lower edges of said access covers cooperating with said ground line cover and the vertical edges of said access covers cooperating with each other to form an uninterrupted vertically extending enclosure housing above ground level, a partition wall extending between the cooperating edges of the wall members and vertically within said enclosure for substantially the full length thereof to divide said enclosure into two compartments, an apertured cap surrounding said pole for closing the upper end of said enclosure, said access covers being individually mounted on said ground line cover for being selectively removable to individually expose the interior of each of said compartments while said partition wall prevents access to the covered compartment, and releasable securing means retaining said enclosure to said pole to establish an integral structure and mutually supporting relation between said pole and said enclosure, said pole extending below ground level a greater distance than said enclosure, the open lower end of said enclosure being constructed and arranged for receiving conductors which may extend into said compartments.

2. The combination set forth in claim 1 wherein a luminaire is supported adjacent the upper end of said pole.

References Cited

UNITED STATES PATENTS

| 1,469,034 | 9/1923 | Benjamin | 240—26 |
| 2,511,440 | 6/1950 | Long | 240—25 |
| 3,215,831 | 11/1965 | Gladsden et al. | 240—84 |
| 3,242,252 | 3/1966 | Bergenstein | 240—84 |
| 3,257,496 | 6/1966 | Hamilton | 174—38 |
| 3,268,651 | 8/1966 | Stevenson | 174—38 |

NORTON ANSHER, *Primary Examiner.*

M. H. HAYES, *Assistant Examiner.*